United States Patent [19]

Wilkinson et al.

[11] Patent Number: 4,677,366
[45] Date of Patent: Jun. 30, 1987

[54] UNITY POWER FACTOR POWER SUPPLY

[75] Inventors: Bruce L. Wilkinson, Torrance; Josh Mandelcorn, Los Angeles, both of Calif.

[73] Assignee: Pioneer Research, Inc., Santa Monica, Calif.

[21] Appl. No.: 862,593

[22] Filed: May 12, 1986

[51] Int. Cl.[4] .............................................. G05F 1/46
[52] U.S. Cl. ...................................... 323/222; 363/21; 363/89
[58] Field of Search .................... 323/222; 363/21, 41, 363/89, 126

[56] References Cited

U.S. PATENT DOCUMENTS 4,347,474  8/1982  Brooks et al. ................... 323/222 X
4,355,277 10/1982  Davis et al. ..................... 323/222 X
4,437,146  3/1984  Carpenter ............................. 363/21
4,536,700  8/1985  Bello et al. ...................... 323/222 X
4,542,330  9/1985  Terbrack ............................. 323/232

OTHER PUBLICATIONS

Mohan et al., "Sinusoidal Line Current Rectification with a 100kHz B-SIT Step-Up Converter", IEEE, 1984, pp. 92-98.

Primary Examiner—Patrick R. Salce
Assistant Examiner—Marc S. Hoff
Attorney, Agent, or Firm—Keith D. Beecher

[57] ABSTRACT

A unity power factor power supply which includes a boost converter connected to the alternating current line which is controlled to draw sinusoidal current from the line by operating as a current regulator having a current reference control signal which tracks the line voltage waveform, thereby to minimize the required input current for a given power output.

4 Claims, 8 Drawing Figures

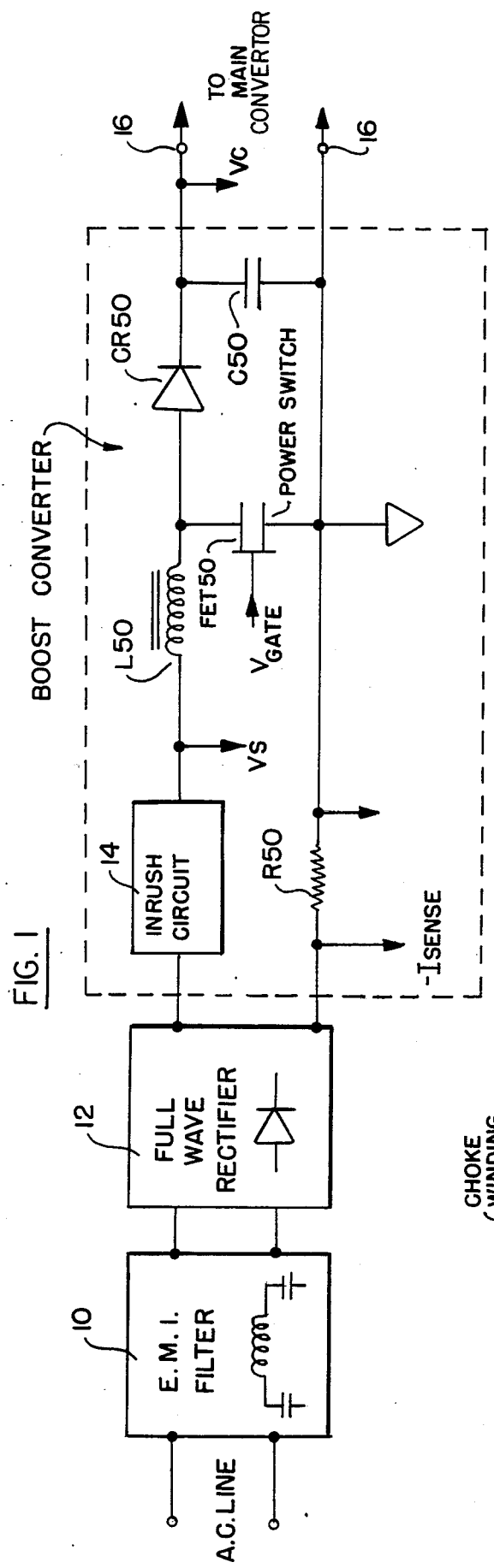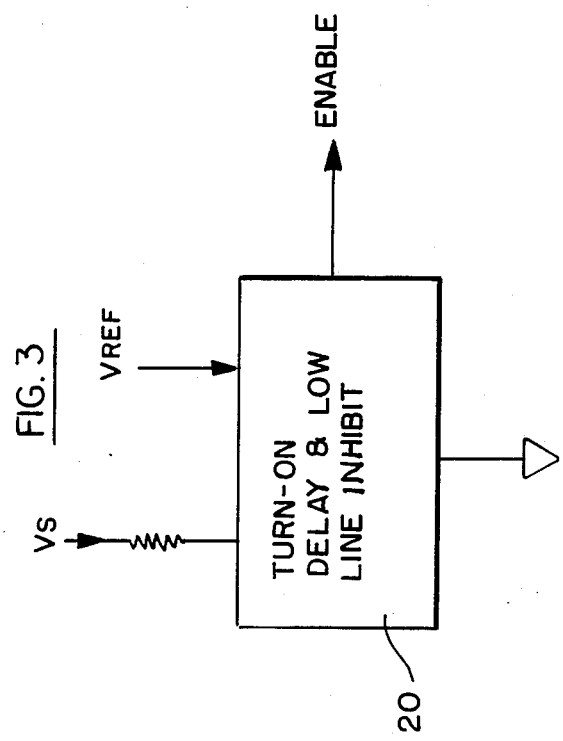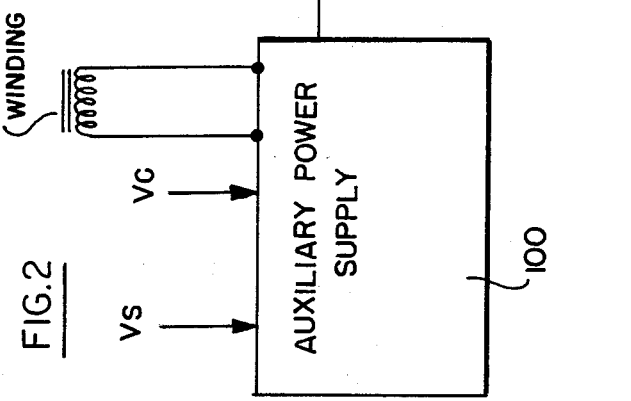

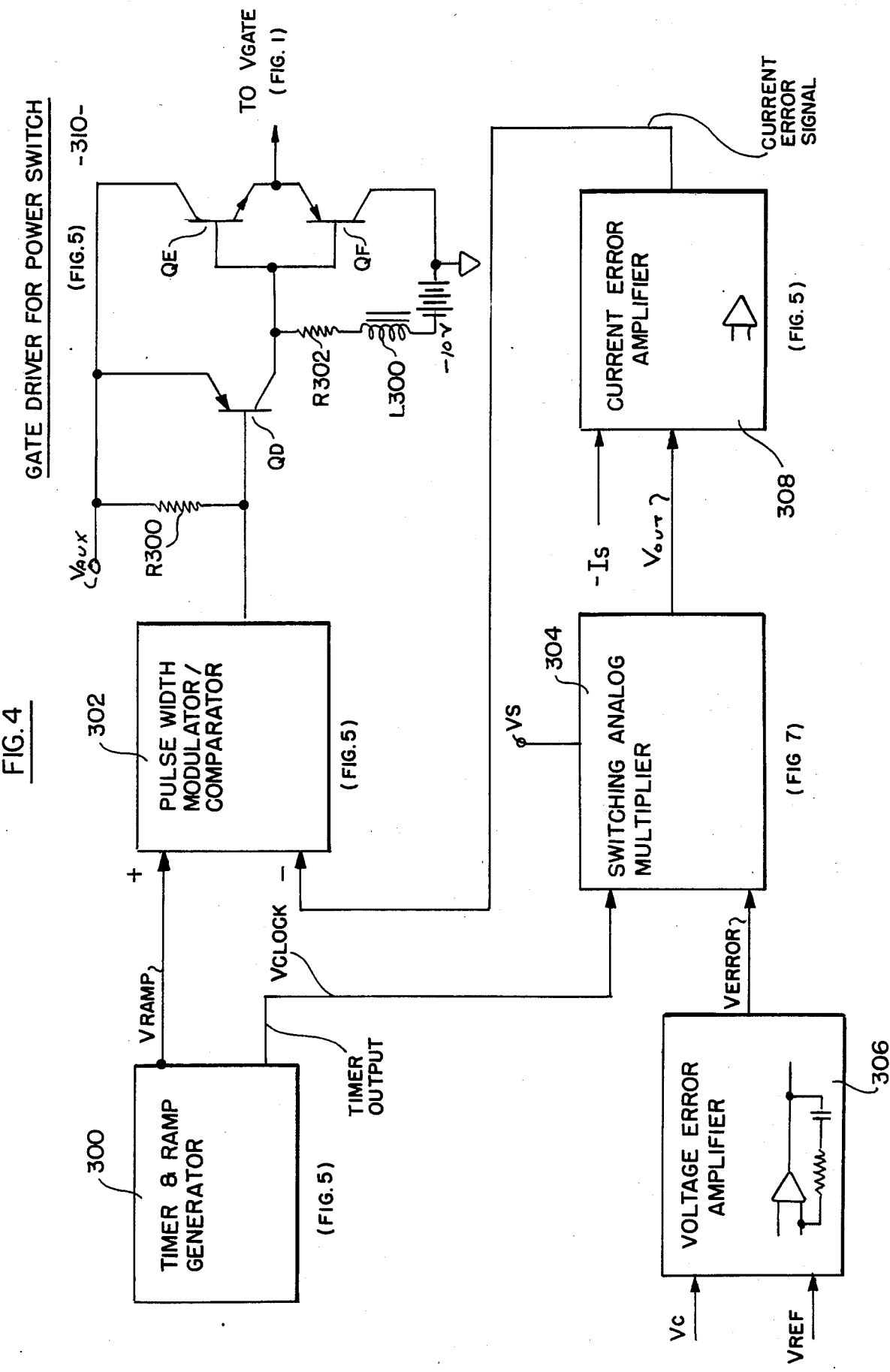

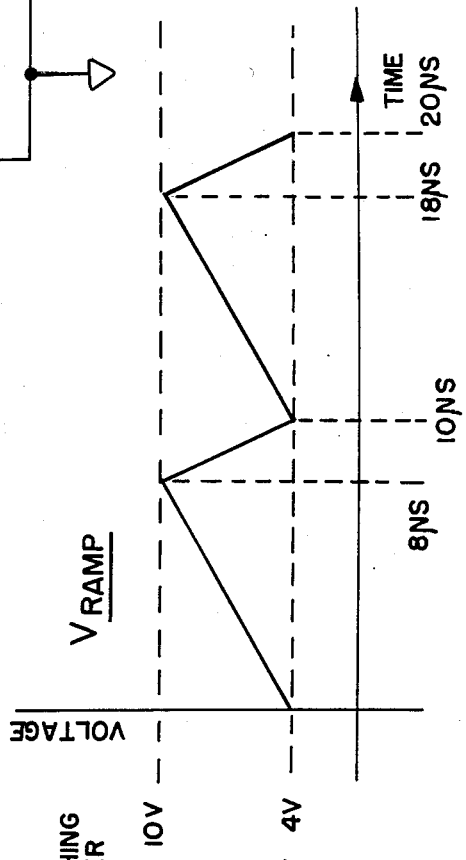

UNITY POWER FACTOR POWER SUPPLY

BACKGROUND OF THE INVENTION

A large number of power electronic units require that the alternating current line voltage be converted to a direct current. For that purpose, power supplies in the form of switched converters and inverters have been provided in the prior art. Such circuits usually involve a large storage capacitor connected across a rectifier bridge output, and this causes the input line current to become highly non-sinusoidal. Accordingly, poor effective power factors are encountered, which results in higher input current for a given power output of the power supplies.

Specifically, a conventional switched power supply operates as a capacitive input load for the rectified line voltage. Such a load draws relatively high currents near the peaks of the alternating current cycle, and substantially zero current for the remainder of the cycle. This results in a poor power factor, which manifests itself as a larger RMS current for a given input voltage and power load, than if the load were purely resistive. A typical prior art switched power supply, for example, draws about 1.5 times the RMS current for a given power output, as compared with a purely resistive load.

Consequently, for a given line current the usual prior art switched power supply is capable of delivering only about two-thirds the power which could be delivered if the line current were sinusoidal, which is the case when the load is purely resistive.

The present invention provides a switched-mode power supply which includes a boost converter between a diode rectifier bridge and the storage capacitor included in the power supply. The boost converter is incorporated into the power supply because (1) it draws a relatively smooth current from the line, and (2) it permits the voltage on the storage capacitor to be higher than the voltage produced by the diode rectifier bridge which provides for more efficient energy storage. The boost converter, as will be described, has an inductance coil in its input circuit and a capacitor in its output circuit, both being desirable for the purposes of the present invention, which will become apparent as the description proceeds.

The boost converter in the power supply of the invention is constructed to draw a sinusoidal current by operating as a current regulator with a current reference control signal set to track the line voltage waveform to control the voltage across the aforesaid storage capacitor. The voltage across the storage capacitor is achieved by controlling the magnitude of the current reference control signal, but not its wave shape, by a regulating signal.

By regulating the voltage across the storage capacitor at a high level, excellent power hold-up time can be achieved when line power is removed, regardless of the input line voltage, with much less storage capacitance being required as compared with the storage capacitance requirements of the prior art switched power supplies.

The circuit and system of the present invention is of the same general type as described in an article entitled "Sinusoidal Line Current Rectification with a 100 KHz B-sit Step-Up Converter"; by Ned Mohan et al (Page 92 of a publication by the I.E.E.E. dated 1984).

BRIEF DESCRIPTION OF THE DRAWINGS

FIG. 1 is a diagram, partly in block form and partly in circuit detail, of a power supply incorporating the concepts of the invention;

FIG. 2 is a diagram, partly in block form and partly in circuit detail, of an auxiliary power supply for supplying a reference voltage;

FIG. 3 is a block diagram of a turn-on delay and low line inhibit circuit for providing an enable signal for the system of the invention only after certain criteria have been fulfilled;

FIG. 4 is a diagram, partly in block form and partly in circuit detail of a control circuit for controlling the system of FIG. 1;

FIG. 5 is a circuit diagram of certain of the components of the control circuit of FIG. 4;

FIG. 6 is a graph showing various curves useful in explaining the operation of a certain component of the circuit of FIG. 5;

DETAILED DESCRIPTION OF THE ILLUSTRATED EMBODIMENT

Figure 7:
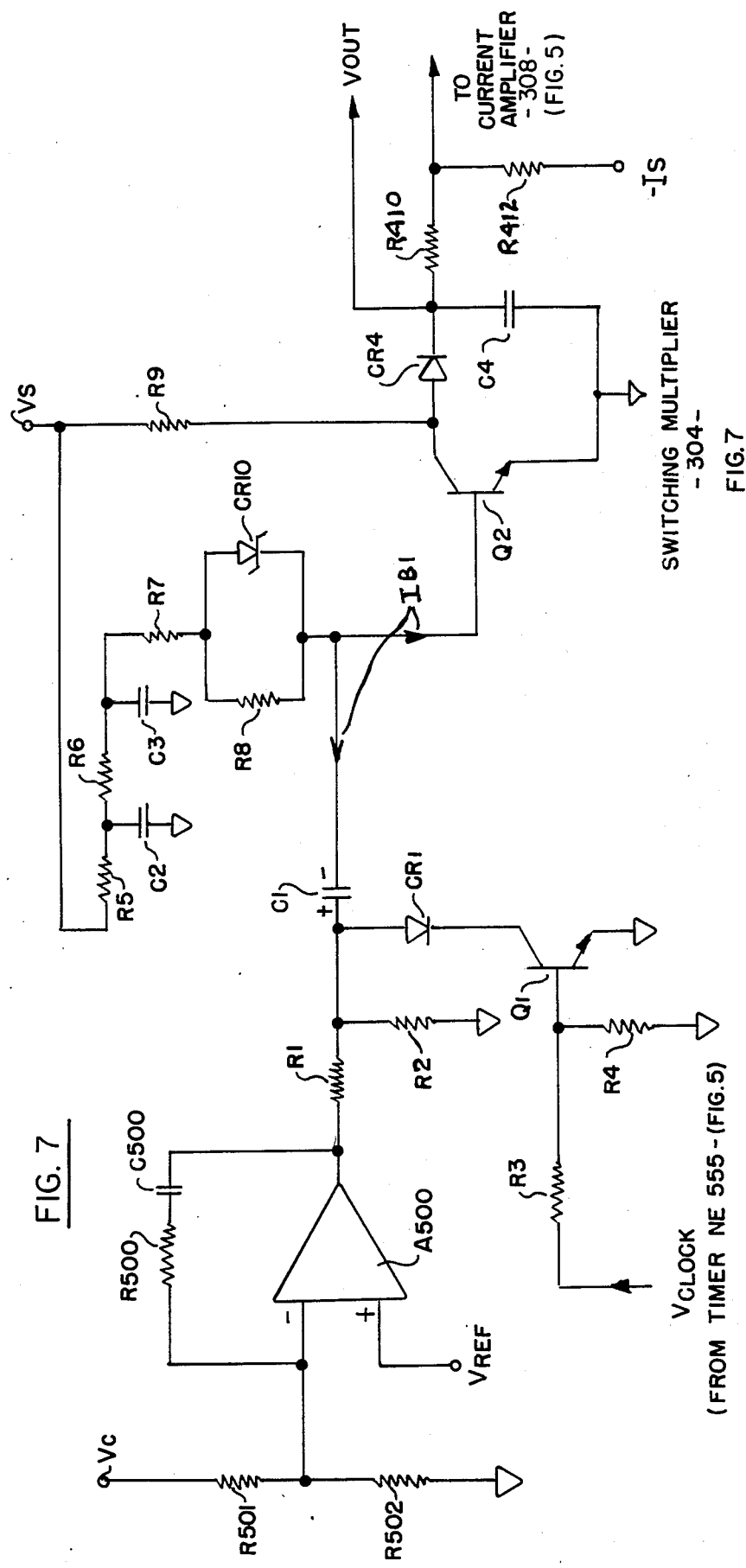
FIG. 7 is a circuit diagram of another component of the system of FIG. 4.

The circuit of FIG. 1 includes an E.M.I. filter 10 which connects the alternating current line to a full-wave diode bridge rectifier 12. The output of the full-wave rectifier 12 is connected to a boost converter which includes an inrush circuit 14 connected through an inductance coil L50 and through a diode CR50 to one of the output terminals 16 of the circuit. The output terminals 16 may be connected to a main switched converter.

The circuit of FIG. 1 provides an appropriate control for the main converter so that the main converter draws power at essentially unity power factor from the AC line, for reduced input current, as described above.

The other output terminal of full-wave rectifier 12 is connected to a resistor R50. The other terminal resistor R50 is grounded, as is the second output terminal 16. A voltage is developed across resistor R50 representing the current flow through the boost converter (Is). A capacitor C50 is connected across the output terminals 16. A field effect transistor FET50, which functions as a power switch, has its drain and source electrodes connected respectively to the junction of inductance coil L50 and diode CR50, and to ground. A control signal designated $V_{gate}$ is applied to the gate of FET 50, in accordance with the invention so that appropriate controls may be effectuated in order to achieve the desired unity power factor.

As shown in FIG. 2, an auxiliary power supply 100 is provided which responds to the voltages $V_S$ at the output of inrush circuit 14, and to the voltage $V_C$ at the ungrounded output terminal 16, to provide a reference voltage $V_{Ref}$. As shown in FIG. 3, a turn-on delay and low line inhibit circuit 200 is provided which responds to the voltages $V_S$ and $V_{Ref}$ to provide an enable signal so that the circuit of FIG. 1 is activated only a predetermined time after the system has been turned on, and only when the line voltage is in excess of a predetermined threshold.

FIG. 4 is a block diagram of the control circuit which supplies the signal $V_{gate}$ to FET50 of FIG. 1. The system of FIG. 4 includes a timer and ramp generator 300 which supplies a ramp voltage $V_{ramp}$ to a pulse width modulator/comparator 302. The block 300 also provides a clock voltage $V_{clock}$ to a switching analog multiplier 304.

The voltages $V_C$ and $V_{Ref}$ are applied to a voltage error amplifier 306, and the resulting error voltage $V_{error}$ is applied to switching multiplier 304. The voltage $V_S$, likewise, is applied to multiplier 304. The output of the switching multiplier 304 is applied to a current error regulator amplifier 308, as is the negative sense signal $I_S$. The current error signal output of amplifier 308 is applied to the pulse width modulator/comparator 302.

The output of the pulse width modulator/comparator 302 is introduced to the base of an PNP transistor $Q_D$. The emitter of transistor $Q_D$ is connected back to the base through a resistor R300, and to the collector of an NPN transistor $Q_E$. The collector of transistor $Q_D$ is connected to the base of NPN transistor $Q_E$ and to the base of a PNP transistor $Q_F$. The collector of transistor $Q_D$ is also connected through a resistor R302 and choke coil L300 to a negative bias. The collector of transistor $Q_F$ is grounded. The emitters of the transistors $Q_E$ and $Q_F$ supply the voltage $V_{gate}$ to FET50 in FIG. 1. This voltage has a waveform such that the main converter is caused to draw power at essentially unity power factor from the alternating current line. The resistor R300, the emitter of transistor $Q_D$ and the collector of transistor $Q_E$ are all connected to an appropriate voltage source $V_{aux}$.

The timer and ramp generator 300 are shown in circuit detail in FIG. 5, and it includes an integrated circuit of the type designated NE555. The clock pulses $V_{clock}$ appear at terminal 3, and the ramp signal $V_{ramp}$ is generated at terminal 7, 2 and 6. The terminals 2 and 6 are connected to a grounded capacitor C400 having a value of 0.00068 microfarads, and the terminals 7 and 2 are connected together through a 2.7 kilo-ohm resistor R400. The terminals 4 and 8 are connected to a voltage source designated $V_{aux}$, and terminal 7 is connected to that source through a 9.53 kilo-ohm resistor R402.

The pulse width modulator/comparator 302 is also shown in circuit detail in FIG. 5, and it includes an NPN transistor $Q_A$ and an NPN transistor $Q_B$, as well as an NPN transistor $Q_C$ which serves as a current sink. The ramp signal $V_{ramp}$ from the ramp generator 300 is applied to the base of transistor $Q_A$. The wave shape of the ramp signal is shown in FIG. 6. The collector of the transistor is connected to $V_{aux}$, and its emitter is connected to a diode CR400. The emitter of transistor $Q_B$ is connected to a diode CR402, and the diodes are connected to the collector of transistor $Q_C$.

The enable signal from the circuit of FIG. 3 is applied to the base of transistor $Q_C$ through a resistor R402, and the base is also connected to a grounded resistor R404. The emitter is connected to a grounded resistor R406. The collector of transistor $Q_B$ is connected to a diode CR404 which, in turn, is connected to $V_{aux}$ through a resistor R406, and to the base of transistor $Q_D$ in the gate driver 310 for the power switch FET50.

The output of current regulator amplifier 308 is connected to the base of transistor $Q_B$ in the pulse width modulator/comparator 302. The current regulator amplifier includes an amplifier A400 whose non-inverting input is connected to the output of the switching multiplier 304 through a resistor R410, and to the negative sense signal $I_S$ through a resistor R412. The inverting input terminal of amplifier A400 is connected to a grounded resistor R414 and to the output through a resistor R416 and capacitor C404.

The voltage error amplifier and the switching multiplier of block 304 of FIG. 4 is shown in circuit detail in FIG. 7. This circuit includes an amplifier A500 whose non-inverting input is connected to the voltage $V_{Ref}$, and whose inverting input is connected to the junction of a resistor R500 and a resistor R502 connected between the voltage $V_C$ and ground. The output of amplifier A500 is connected back to the inverting input through a capacitor C500 and resistor R500.

The output of amplifier A500 is also connected to a resistor R1 which, in turn, is connected to a capacitor C1, and to a grounded resistor R2. The clock signal $V_{clock}$ from the integrated circuit NE555 of FIG. 5 is introduced through a resistor R3 to the base of an NPN transistor Q1. The base is also connected to a grounded resistor R4.

Figure 8:
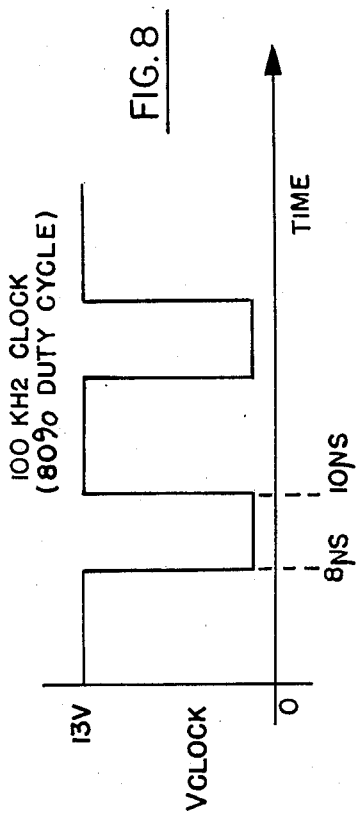
FIG. 8 is a graph useful in explaining the operation of the circuit of FIG. 7.

The waveform of the $V_{clock}$ is shown in FIG. 8. The emitter of transistor Q1 is grounded, and the collector is connected to a diode CR1 which, in turn, is connected to the junction of resistor R1 and capacitor C1. Capacitor C1 is connected to the base of an NPN transistor Q2 and to a Zener diode CR10 and resistor R8. Resistor R8 and the Zener diode are connected through a resistor R7, and through resistors R6 and R5 to the $V_S$ voltage source. The junction of resistors R5 and R6 is connected to a grounded capacitor C2, and the junction of resistors R6 and R7 is connected to a grounded capacitor C3.

The collector of NPN transistor Q2 is connected to the voltage source $V_S$ through a resistor R9 and to a diode CR4. The emitter of transistor Q2 is connected to a capacitor C4 and to ground. Diode CR4 and capacitor C4 are connected to an output terminal at which a voltage $V_{out}$ is obtained. These elements are also connected to resistor R410 of the current amplifier 308 of FIGS. 4 and 5.

When the $V_{clock}$ signal is low (FIG. 8), transistor Q1 is non-conductive, and capacitor C1 is charged to the output of the voltage error amplifier 308 divided by R2/(R1+R2). Transistor Q2 remains conductive and current flow through resistor R9 from $V_S$ is not transferred to capacitor C4 and resistor R410.

When $V_{clock}$ goes high, transistor Q1 is rendered conductive, and the resulting current flow through capacitor C1 causes the voltage on the base of transistor Q2 to become negative rendering transistor Q2 non-conductive. Current now flows from $V_S$ through resistor R9 and diode CR4 to capacitor C4, and through resistor R410 to the output of the switching modulator 304.

Now current IB1 (which flows from $V_S$ through circuit R5, R6, R7, R8, C2, C3 and CR10) charges capacitor C1 to a voltage level at which the negative bias is removed from the base of transistor Q2, and transistor Q2 becomes conductive. This stops the flow of current to capacitor C4 and resistor R410, and the cycle repeats.

Now the time that transistor Q2 is non-conductive is proportional to $V_{ERROR}$/IB1. But IB1 is proportional to $(V_{LINE\ RMS})^2$. Accordingly, the output of the switching multiplier 304 is proportional to the time transistor Q2 is non-conductive multiplied by the instantaneous line voltage divided by R9.

Therefore:

$$V_{out} \alpha V_{line\ inst} \times \frac{V_{error}}{IB1}, \text{ or}$$

$$V_{out} \alpha \frac{V_{error} \times V_{line\ inst}}{(V_{line\ RMS})^2}$$

In operation of the system, any drop in the output voltage $V_C$ (FIG. 1) below the reference voltage $V_{ref}$ (FIG. 2) causes the voltage error amplifier 306 of FIG. 4 to produce an output voltage $V_{error}$. This output voltage is introduced to the switching analog multiplier where it is multiplied by $$K \cdot \frac{V_{line\ inst}}{(V_{line\ rms})^2}$$

Where:
K is a constant
$V_{line\ inst}$ is the instantaneous line voltage
$V_{line\ rms}$ is the RMS line voltage The above term is derived in the switching analog multiplier 304 from the rectified alternating current voltage $V_S$, as described in conjunction with FIG. 7. The analog multiplier is switched by the clock signal $V_{clock}$ derived from the timer and ramp generator 300 of FIG. 5, and also described in conjunction with FIG. 7.

The output $V_{OUT}$ of analog multiplier 304 represents the current reference of the circuit which tracks the line voltage waveform, and it is compared with $-I_S$ in the current regulator amplifier 308 (FIG. 5) to produce an output representative of the error current. The term $-I_S$ represents the current drawn by the system (FIG. 1).

The output from the current regulator amplifier 308 and the ramp signal $V_{ramp}$ from the timer and ramp generator 300 of FIG. 5 are applied to the pulse width modulator and comparator 302 described above, to produce the $V_{gate}$ voltage for FET50 of FIG. 1. This voltage is in the form of width modulated pulses and represent a switching signal for the boost converter which is a function of a regulating signal having a current reference tracked to the line voltage waveform. In this manner, the boost converter is switched under a regulation control, as described above, so as to provide the desired unity power factor for the power supply.

It will be appreciated that while a particular embodiment of the invention has been shown and described, modifications may be made. Such modifications which fall within the spirit and scope of the invention are intended to be covered by the following claims.

We claim:
1. In a switched power supply: a rectifier adapted to be connected to the alternating current line; a boost converter connected to the output of said rectifier, said converter including an input circuit having a series-connected inductance coil and an output circuit having a shunt-connected storage capacitor, and further including a power switch connected between the inductance coil and the storage capacitor; and a control circuit connected to said power switch for providing a switching control signal for said converter having a current reference which tracks the waveform of the alternating current line voltage to cause the power supply to exhibit unity power factor to the alternating current line, said control circuit including a voltage error amplifier connected to the output of said converter and to a source of reference voltage for producing an output which is a function of the difference between the output voltage of the converter and the reference voltage from the source, a switching analog multiplier circuit connected to the output of said voltage error amplifier and to the output of said rectifier to produce an output which is proportional to the output of said voltage error amplifier multiplied by the instantaneous line voltage and divided by the RMS line voltage squared, a current regulator amplifier connected to the converter and to the multiplier and responsive to a voltage representing the current flow in the converter and to the output of the multiplier for producing a current error signal, and circuit means including a pulse-width modulator connected to said current regulator amplifier and responsive to said current error signal therefrom for introducing said switching control signal to said power switch.

2. The combination defined in claim 1, in which said multiplier is a switching type, and in which said control circuit includes a timer and ramp signal generator for supplying clock signals to said switching multiplier and ramp signals to said pulse width modulator.

3. The combination defined in claim 1, in which said power switch comprises a field effect transistor.

4. The combination defined in claim 1, in which said rectifier comprises a full-wave diode rectifier.

* * * * *